United States Patent [19]
Park

[11] Patent Number: 5,953,395
[45] Date of Patent: Sep. 14, 1999

[54] COMMUNICATION APPARATUS USING TELEPHONE NETWORK

[75] Inventor: Yong-Pal Park, Kyungsangbook-Do, Rep. of Korea

[73] Assignee: LG Semicon Co., Ltd., Cheongju, Rep. of Korea

[21] Appl. No.: 08/987,197

[22] Filed: Dec. 9, 1997

[30] Foreign Application Priority Data

Dec. 31, 1996 [KR] Rep. of Korea ................... 96/79117

[51] Int. Cl.[6] .................................................. H04M 11/00
[52] U.S. Cl. ................................. 379/93.09; 379/93.01; 379/93.05
[58] Field of Search ........................... 379/93.05, 93.06, 379/93.07, 93.09, 93.01, 93.26, 100.01, 100.02, 100.06, 100.12

[56] References Cited

U.S. PATENT DOCUMENTS

| | | | |
|---|---|---|---|
| 5,042,028 | 8/1991 | Ogawa | 370/58.2 |
| 5,317,629 | 5/1994 | Watanabe | 379/93.09 |
| 5,493,609 | 2/1996 | Winseck, Jr. et al. | |
| 5,715,066 | 2/1998 | Kurita et al. | 358/296 |
| 5,717,744 | 2/1998 | Yoshida et al. | 379/100.06 |

*Primary Examiner*—Reinhard J. Eisenzopf
*Assistant Examiner*—Melur Ramakrishnaiah
*Attorney, Agent, or Firm*—Fleshner & Kim

[57] ABSTRACT

A communication apparatus for use with a telephone network is provided that includes a DCE controller that controls first and second switches to convert modes based on a transmission/reception state. A mode detector determines whether an applied signal is a voice signal or a data signal. First and second buffers are enabled based on a detection signal from the mode detector to respectively transmit a ring signal or the data signal. A modem controller receives an output signal of the second buffer through the second switch. The DCE controller can receive and apply to an internal processor the output signal from the second buffer via the MODEM controller. Further, an indicator unit that receives the output signal of the second buffer illuminates a light or generates a beeping sound for notification of a received dated signal. Alternatively, a ring generator generates a ring signal for a telephone for a received voice signal. Thus, the communication apparatus enables a user to determine whether to use a telephone set or a facsimile machine or the like, for telephone reception by providing indications that identify the kinds of incoming phone calls.

13 Claims, 2 Drawing Sheets

COMMUNICATION APPARATUS USING TELEPHONE NETWORK

BACKGROUND OF THE INVENTION

1. Field of the Invention

The present invention relates to a communication apparatus, and in particular, to a communication apparatus that determines whether a received message is a voice message or a facsimile message.

2. Background of the Related Art

FIG. 1 illustrates a block diagram of a related art communication apparatus using a telephone network. As shown in FIG. 1, the communication apparatus is connected to a telephone network 50, and includes a Data Circuit Terminating Equipment (DCE) 14, and a telephone set 12 connected to the DCE 14. A telephone signal applied via telephone line 16 sequentially passes through a first switch 220, a second switch 226, a third switch 234, a high pass filter (HPF) 238, an adder 260, a limiter 240 and an automatic gain controller 248 so that a tone signal is detected by first and second tone detectors 242, 244.

A MODEM controller 246 determines whether the applied signal is a voice signal or a data signal. The determined signal is transmitted to a DCE controller 230. The DCE controller 230 controls a fourth switch 231, so that the received signal is applied to the telephone set 12. When a telephone call is received, a ring detector 236 immediately generates a ring signal irrespective of whether the received call is a voice call or a data call.

The related art communication apparatus using a telephone network has a disadvantage in that if a data call is received, the received call is applied to an external processor through the MODEM 222. As described above, when a call signal is applied to the related art communication apparatus using a telephone network, a ring signal is activated, the type of the call signal is detected and the call signal is either transmitted to the telephone set or applied to an external processor. Accordingly, the related art apparatus makes it difficult for a user to determine whether to use the telephone set or a computer for receiving an incoming telephone call.

SUMMARY OF THE INVENTION

An object of the present invention to provide a communication apparatus that substantially obviates the problems and disadvantages of the prior art.

Another object of the present invention to provide a communication apparatus determines whether to use a telephone set or a facsimile machine or the like for telephone reception.

A further object of the present invention to provide a communication apparatus that allows a user to determine whether to use a telephone set or a facsimile machine for telephone reception by separately displaying indications to indicate the incoming phone call type.

To achieve at least the above-described objects in whole or in parts, there is provided a communication apparatus using a telephone network that includes: a plurality of switches that switch based on an operational mode of the apparatus, a mode detector that determines whether an input signal is one of a first signal and a second signal, a generator that generates a first prescribed signal when the first signal is received, an indicator that indicates when the second signal is received, a controller that transmits the second signal, and a data circuit terminating equipment (DCE) controller that controls the plurality of switches based on a signal output from the mode detector.

To further achieve the above-described objects, in whole or in parts, there is provided a communication apparatus using a telephone network that includes: a plurality of switches that switch based on a transmission/reception state, a mode detector that determines whether an input signal is one of a voice signal and a data signal, a plurality of buffers that filter the input signal, a generator that generates a first prescribed signal when the voice signal is received, an indicator that indicates when the data signal is received by performing at least one of illuminating a light and generating a second prescribed signal, a controller that transmits the data signal, and a data circuit terminating equipment (DCE) controller that controls the plurality of switches based on the determination of the mode detector, and wherein the DCE controller receives the data signal from the controller.

DETAILED DESCRIPTION OF PREFERRED EMBODIMENTS

Figure 1:
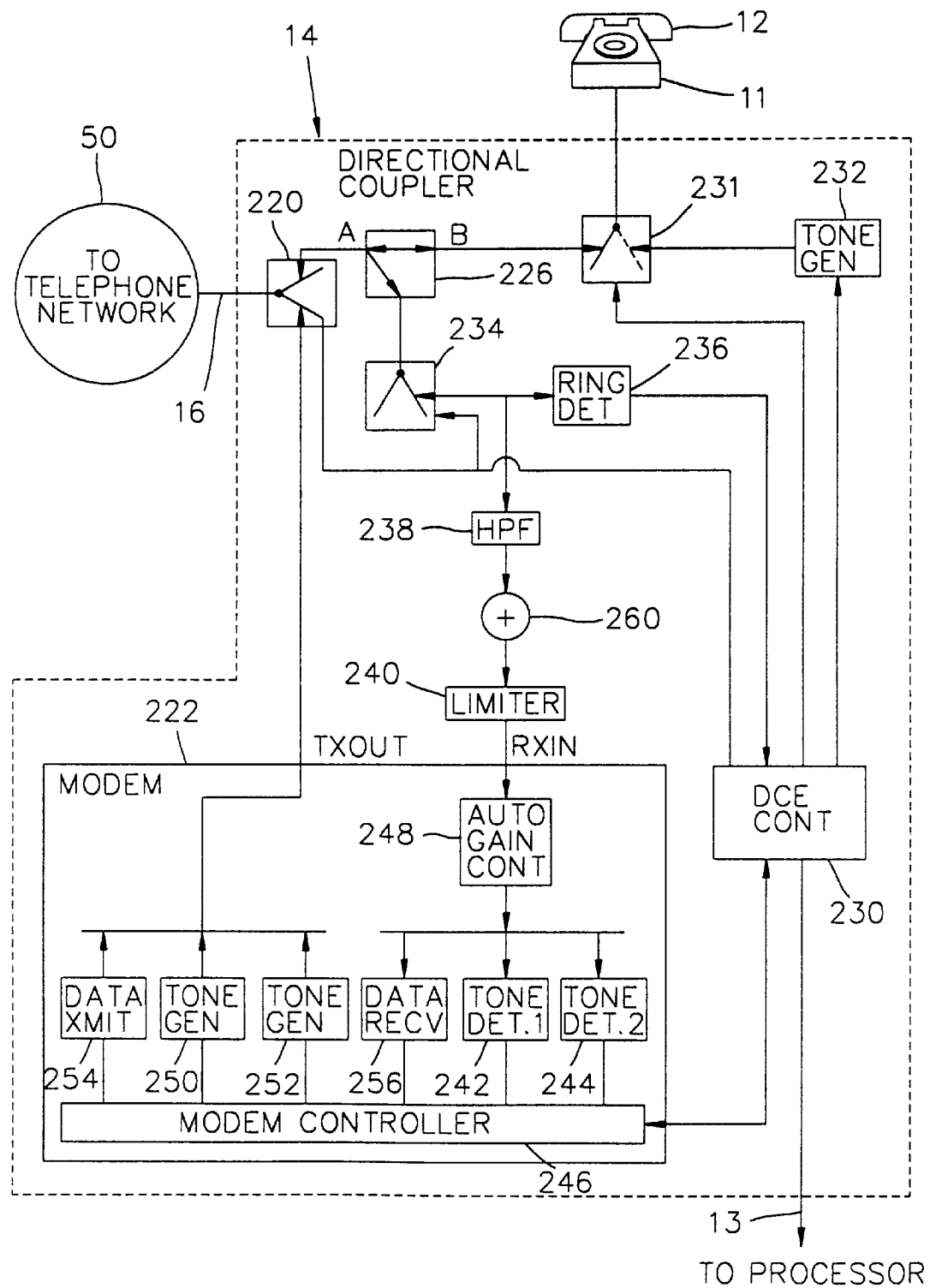
FIG. 1 is a block diagram illustrating a related art communication apparatus using a telephone network.
Figure 2:
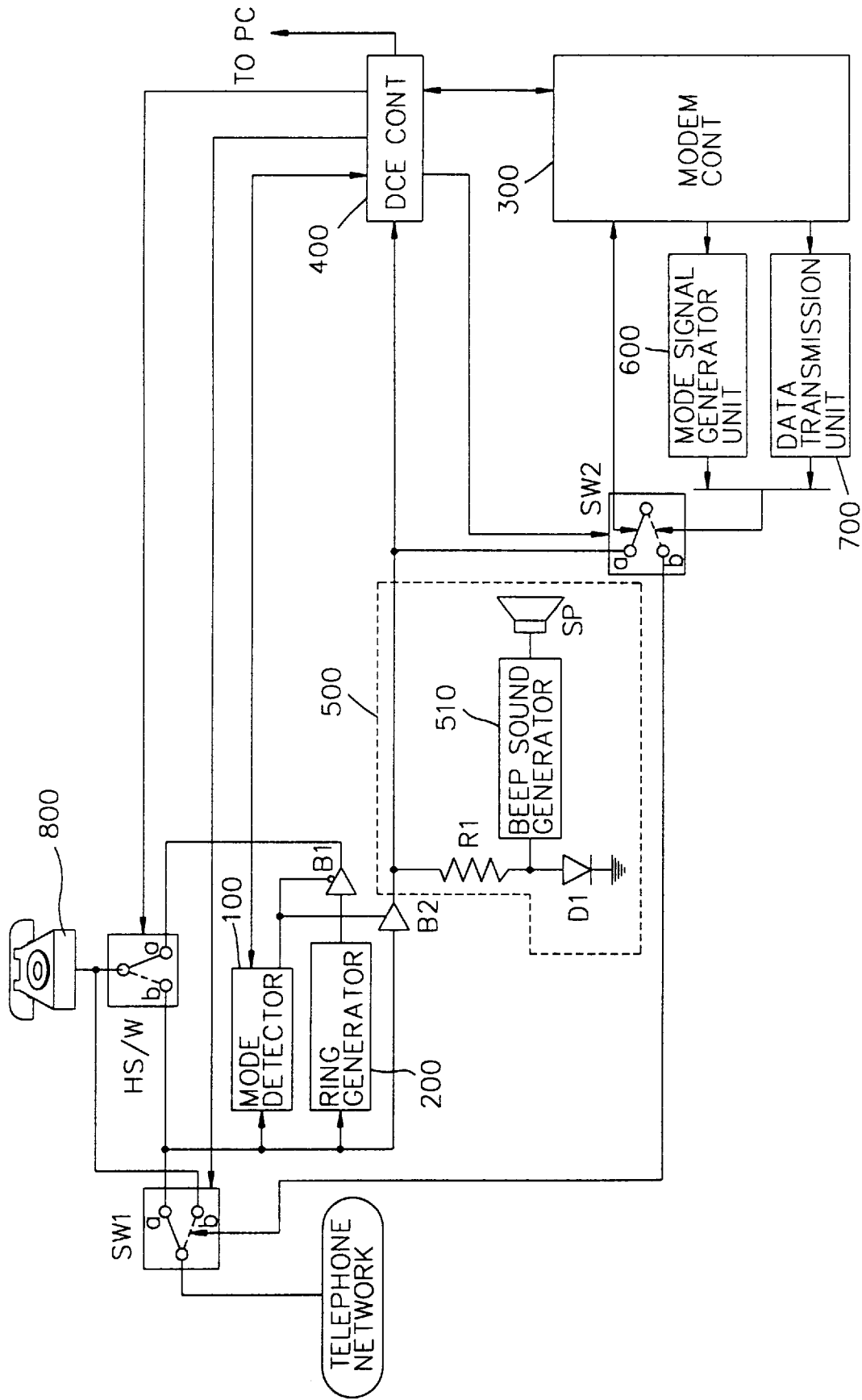
FIG. 2 is a block diagram illustrating a preferred embodiment of a communication apparatus using a telephone network according to the present invention.

FIG. 2 illustrates a preferred embodiment of a communication apparatus according to the present invention. As shown in FIG. 2, the preferred embodiment of the communication apparatus can be coupled to a telephone network and includes first and second transmission/reception converting switches SW1, SW2 for converting a mode depending on a transmission/reception state. A mode detector 100 determines whether the signal received from the first transmission/reception converting switch SW1 is a voice signal, a data signal or the like. A ring generator 200 generates a ring signal when a signal is received from the first transmission/reception converting switch SW1.

A first tri-state buffer B1 is enabled based on a detection signal outputted from the mode detector 100. The first tri-state buffer B1 transmits the ring signal generated from the ring generator 200. A second tri-state buffer B2 is enabled based on the detection signal outputted from the mode detector 100. The second buffer transmits a signal outputted from the first transmission/reception converting switch SW1. A MODEM controller 300 receives an output signal of the second buffer B2 through the second transmission/reception converting switch SW2 for subsequent processing and transmission.

A DCE controller 400 controls the first and second transmission/reception converting switches SW1, SW2 based on a signal transmission/reception state. The DCE controller 400 receives and applies to an internal processor a data signal from the MODEM controller 300. In addition, an indicator 500 receives the output signal of the second buffer B2 to indicate a data signal input by illuminating a light, generating a beeping sound or the like. Further the communication apparatus includes a mode signal generation unit 600 and a data transmission unit 700.

The indicator 500 may include a light emitting diode (LED) D1 that receives an output signal of the second buffer B2 through a resistance R1 to emit light. The indicator can also include a beep sound generator 510 receiving an output signal of the second buffer through the resistance R1 to generate a beep sound. Then, for example, the generated sound can be output to a speaker SP.

Operations of the preferred embodiment of the communication apparatus will now be described. The first and second transmission/reception converting switches SW1, SW2 cause respective contacts "a" therein to be coupled in a reception mode. Respective contacts "b" in the switches SW1, SW2, are coupled in a transmission mode. A hook switch HS/W includes a contact "a" coupled in an on-hook mode, and a contact "b" coupled when a telephone receiver is picked up.

A telephone signal applied through the telephone line in the reception mode is transmitted through the first transmission/reception converting switch SW1, to the hook switch HS/W, to the mode detector 100, to the ring generator 200 and to the second buffer B2. When an external telephone call signal is applied, the mode detector 100 determines whether the externally applied signal is a voice signal, a data signal or the like, and the ring generator 200 generates a ring signal.

When the received signal is a voice signal, the mode detector 100 preferably outputs a "low" level signal. The first buffer B1 is enabled and the second buffer B2 is disabled. Thus, a signal generated from the ring generator 200 is applied to the telephone set 800 through the hook switch HS/W to ring the telephone set 800. Accordingly, when the received signal is a voice signal, the telephone set begins ringing to notify that the telephone set is in use.

When the received signal is a data signal, the mode detector 100 preferably outputs a "high" level signal. The first buffer B1 is disabled, and the second buffer B2 is enabled. The received signal is applied to the DCE controller 400 and to the second transmission/reception converting switch SW2, respectively.

The MODEM controller 300 receives the data signal through the second transmission/reception converting switch SW2. The MODEM controller 300 demodulates and transmits to the DCE controller 400 the received data signal. Then, the DCE controller 400 can transmit the received data signal to the internal data processor.

The data signal outputted from the second buffer B2 is also applied to the light-emitting diode D1 through the resistance R1. Accordingly, the light-emitting diode D1 emits light, and the beep sound generator 510 generates a beep sound through the speaker SP.

When the externally applied signal is a data signal, the telephone set does not ring. However, the light-emitting diode D1 emits light and the beep sound generator 510 generates the beep sound. Thus, a user can notice whether the received call signal is a data signal.

In a transmission mode, when the telephone set 800 is picked up, the contact "b" in the hook switch HS/W is coupled to make the telephone set 800 ready for communication. To perform a data transmission, the respective contacts "b" in the first and second transmission/reception converting switches SW1, SW2 are respectively coupled. Then, a data transmission operation of the preferred embodiment using a phone, a facsimile machine, a MODEM or the like can be performed similar to the reception operation.

As described above, the preferred embodiment of a communication apparatus using a telephone network according to the present invention has various advantages. The preferred embodiment enables a user to determine whether to use a telephone set or a facsimile machine for telephone reception by separately displaying indications. Thus, the user is notified of the kinds of incoming phone calls.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A communication apparatus coupled to a telephone network, comprising:

a plurality of switches that switch based on a transmission/reception state;

a mode detector that determines whether an input signal is one of a voice signal and a data signal;

a first buffer that receives the input signal;

a generator that receives the input signal and outputs a first prescribed signal when the voice signal is received;

a first switch for connection to a telephone;

an indicator that receives the data signal and indicates when the data signal is received by performing at least one of illuminating a light and generating a second prescribed signal;

a second buffer, wherein the second buffer is connected between the generator and the first switch, wherein the mode detector controls the second buffer to transmit the first prescribed signal and the voice signal to the first switch when the input signal is received, and wherein the mode detector controls the first buffer to transmit the data signal to the indicator when the input signal is received;

a modem controller connected to the first buffer that at least one of receives and transmits the data signal; and a data circuit terminating equipment (DCE) controller that controls the plurality of switches based on the transmission/receptive state, and wherein the DCE controller receives the data signal from the modem controller.

2. The communication apparatus of claim 1, wherein the first and second buffers are controlled by an output signal from the mode detector.

3. The communication apparatus of claim 1, wherein an operational mode of the apparatus is one of a transmit mode and a receive mode based on the transmission state and the reception state.

4. The apparatus of claim 3, wherein the plurality of switches receive the input signal in the receive mode and transmit an output signal in the transmit mode.

5. The communication apparatus of claim 1, wherein the DCE controller receives the data signal output from the second buffer and transmits the data signal to a processor, and wherein a telephone receives the first prescribed signal output by the generator.

6. The communication apparatus of claim 1, wherein the plurality of switches are hook switches.

7. The communication apparatus of claim 1, wherein the data signal is one of a facsimile signal and modem signal.

8. The communication apparatus of claim 1, wherein the generator is a ring generator and the first prescribed signal is a ring signal.

9. The communication apparatus of claim 1, wherein the first and second buffers are tri-state buffers, and wherein an output signal of the mode detector mutually exclusively enables and disables the first and second buffers, respectively.

10. The communication apparatus of claim 1, wherein the input signal is received from the telephone network, and wherein the first switch switches based on an on-hook signal.

11. The communication apparatus of claim 10, wherein the first and second buffers are controlled by an output signal from the mode detector.

12. The apparatus of claim 1, wherein the DCE controller transmits the data signal to a processor, and wherein the telephone receives the first prescribed signal output by the generator via the first switch.

13. The communication apparatus of claim 1, wherein the data signal is at least one of an audio signal, a video signal, a control signal and a pager signal.

* * * * *